United States Patent [19]

Kellogg

[11] 4,267,007
[45] May 12, 1981

[54] WINDING APPARATUS FOR THE MANUFACTURE OF FILAMENT-WOUND, REINFORCED RESINOUS PRODUCTS

[76] Inventor: Charles W. Kellogg, 18220 NE. Cramer Rd., Battleground, Wash. 98604

[21] Appl. No.: 21,679

[22] Filed: Mar. 19, 1979

[51] Int. Cl.³ .............................................. B65H 81/00
[52] U.S. Cl. .................................. 156/425; 118/109; 118/234; 118/246; 118/420
[58] Field of Search .............. 156/195, 184, 173, 175, 156/169, 446, 425, 428–432; 242/7.16, 2, 26.3, 7.15, 43.1; 118/246, 249, 234, 420, 109; 74/242.1 R, 243 R, 242.14 B, 665 E, 340, 242.11 B

[56] References Cited

U.S. PATENT DOCUMENTS

| | | | |
|---|---|---|---|
| 2,199,331 | 4/1940 | Garlsson | 74/242.11 B X |
| 2,492,187 | 1/1970 | Hirtzer | 156/431 X |
| 2,995,175 | 8/1961 | Lundskow | 156/429 |
| 3,226,273 | 12/1965 | Becker | 156/429 X |
| 3,307,998 | 3/1967 | Boggs | 156/425 X |
| 3,402,942 | 9/1968 | Shimano | 74/242.1 R |
| 3,676,258 | 7/1972 | Jackson | 156/432 |
| 3,735,733 | 5/1973 | Henc | 118/221 X |
| 3,800,742 | 4/1974 | Hunter | 118/246 |
| 3,905,856 | 9/1975 | Magee et al. | 156/425 |

*Primary Examiner*—David A. Simmons
*Attorney, Agent, or Firm*—Eugene D. Farley

[57] ABSTRACT

Winding apparatus for the manufacture of fiberglass pipe and other filament-wound, reinforced resinous products comprises a rotatable mandrel; a vat stationed adjacent the mandrel and adapted to contain a quantity of liquid, settable resin; and a reciprocating carriage assembly supporting the vat. The filamentous reinforcing material is guided across the top of an applicator roll rotatably mounted within the vat thereby impregnating the filaments with resin. The impregnated filaments then are squeegeed and guided onto the mandrel, the rotation of which pulls the filaments through the vat. As the carriage mounting the vat reciprocates, the filaments are wound on the mandrel in a predetermined pattern to produce the finished filament-wound, reinforced resinous product.

6 Claims, 9 Drawing Figures

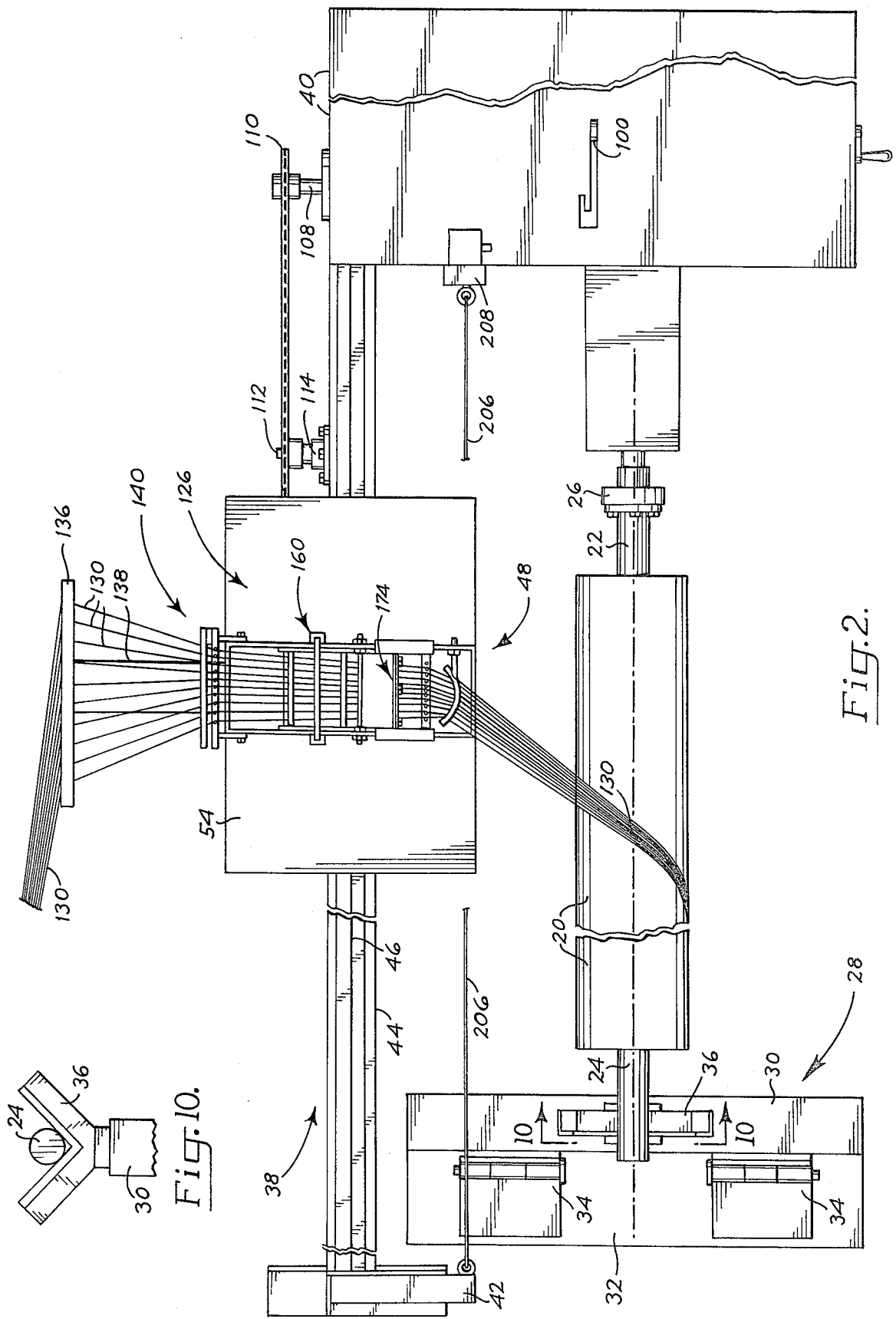

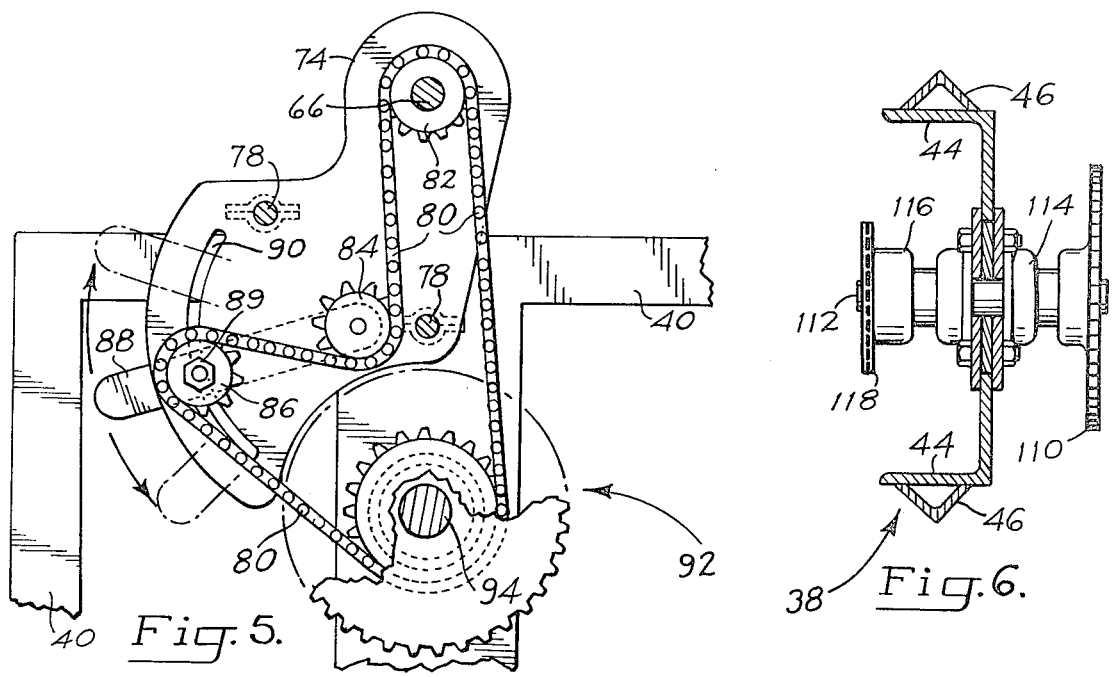
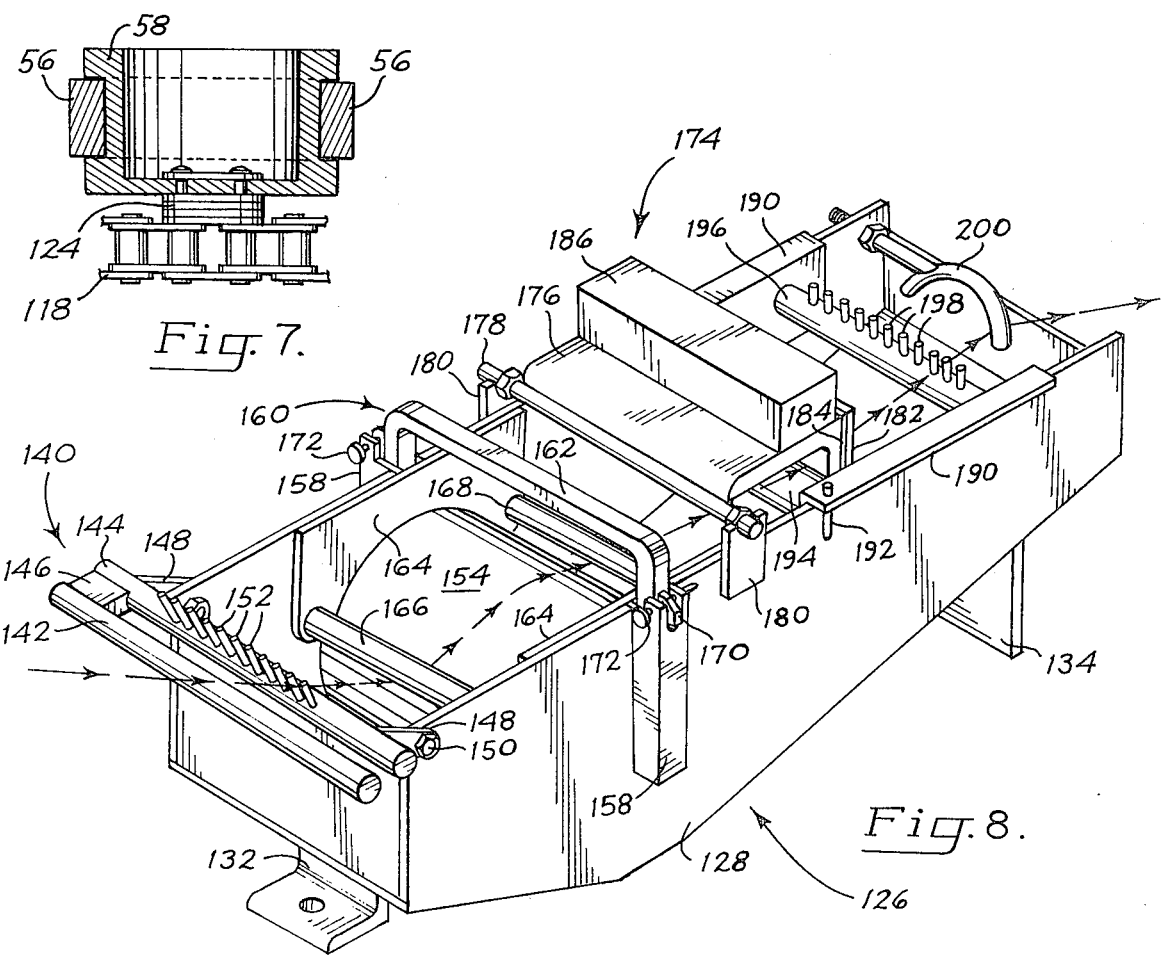

WINDING APPARATUS FOR THE MANUFACTURE OF FILAMENT-WOUND, REINFORCED RESINOUS PRODUCTS

BACKGROUND AND BRIEF STATEMENT OF THE INVENTION

This invention pertains to winding apparatus for the manufacture of filament-wound, reinforced resinous products.

In the manufacture of products such as pipes, cases, reaction vessels, cones and bottles it is conventional practice to impregnate glass or other filaments with a settable resin and to wind them on a mandrel to build up the desired shape in the desired thickness. Upon curing of the resin, the shape is removed from the mandrel and applied to its intended use.

The effectuation of this procedure is accompanied by serious problems not the least of which is plugging of the apparatus by the fiberglass rovings or other filamentous material employed, the difficulty of adapting the apparatus to the fabrication of shapes of diverse size and contour, and the necessity of operating with resinous products which set very rapidly, e.g. with catalyzed epoxy resins which in a time periof of less than half an hour cure to hard glassy solids which are difficult to remove from containers in which they are contained and surfaces upon which they are coated.

Accordingly, it is the general object of the present invention to provide apparatus for the indicated purpose which is quick and easy to disassemble and clean; which can be employed to build a wide variety of shapes, sizes and contours, including cylindrical, conical and square shapes, both large and small; which is quick and easy to convert to the manufacture of various products; which can be operated by but a single operator; which can be adjusted easily to lay selected filament winding patterns; which is self-lubricating in operation; which may be used with a variety of filaments and resins; which lays the filaments uniformly to provide a product of uniform strength; and which is simple in construction, comparatively low in cost, slow running, and easily maintained.

The foregoing and other objects of my invention are accomplished by means of winding apparatus which, broadly considered, comprises a mandrel, mandrel mounting means rotatably mounting the mandrel, and, positioned parallel to the mandrel a spaced distance therefrom, a track supporting a reciprocating carriage. Drive means, and variable speed coupling means couple the drive to the mandrel for rotating the same at a selected rotational speed, and to the carriage for reciprocating it at a selected velocity.

A vat is mounted on this carriage. It is adapted to contain a quantity of epoxy or other liquid, settable resin.

In easily demountable operating sequence, there are positioned within the vat an upstream filament guide for guiding a plurality of filaments in separated, parallel relation to the vat; a resin applicator roll rotatably mounted in the vat downstream from the upstream filament guide with at least its lower portion submerged in the resin; a combination hold-down and guide assembly positioned above the roll for holding down the roll and for pressing the filaments in frictional engagement with the upper surface of the roll; a squeegee postioned downstream from the roll for wiping excess resin from the filaments; a downstream filament guide for maintaining the filaments in separated, parallel relation as they traverse the vat; and a terminal clustering guide for clustering the filaments as they leave the vat.

At the beginning of the operation the ends of the filaments are tied to the mandrel. Rotation of the mandrel thereupon pulls the filaments from the spools on which they are contained, through the vat, and onto the mandrel in a pattern determined by the rotational speed of the mandrel and the reciprocating speed of the carriage.

THE DRAWINGS

FIG. 2 is a foreshortened plan view of the apparatus.

FIG. 5 is a detailed sectional view taken along lines 5—5 in FIG. 3 and illustrating a shiftable coupling for connecting the drive to the mandrel for imparting selected rotational speeds to the mandrel.

FIG. 6 is a detailed transverse sectional view taken along line 6—6 of FIG. 1.

FIG. 7 is a fragmentary, detailed plan view taken along line 7—7 of FIG. 1.

FIG. 8 is a view in perspective of a vat assembly employed for impregnating the filaments with resin, the arrows illustrating the filament travel therethrough.

FIG. 10 is a detailed fragmentary view in elevation looking in the direction of the arrows 11—11 of FIG. 2 and illustrating the manner of mounting the mandrel component of the apparatus.

DESCRIPTION OF A PREFERRED EMBODIMENT OF THE INVENTION

The hereindescribed winding apparatus for the manufacture of filament wound reinforced resinous products basically comprises a mandrel sub-assembly, a reciprocating carriage sub-assembly adjacent the mandrel; a drive for both mandrel and carriage; and a vat sub-assembly adapted to contain a quantity of settable resin and having provision for guiding the filaments in spaced, parallel relation across an applicator roll for impregnating the filaments with resin, a squeegee for wiping off the excess resin, and a clustering guide for clustering the individual filaments together preliminary to applying them to the mandrel.

Considering the foregoing elements in the order named:

The Mandrel

As indicated above, the hereindescribed filament impregnating and winding apparatus is adapted for use with filaments and resins of various categories. Although it is described herein with reference to the use of glass filaments and a settable resin in the production of fiberglass products, no limitation thereby is intended.

In the manufacture of the reinforced resinous products, filamentous glass rovings are impregnated with settable resin, e.g. epoxy resin, and then wound on a rotating mandrel of the selected shape, contour and design. The filaments are tied to the mandrel, the revolution of which accordingly pulls the filaments through the apparatus.

The mandrel may be of selected size, contour and design. It is a feature of the invention that a variety of readily interchangeable mandrels having diverse contours such as tapered, cylindrical, or square may be employed.

Figure 1:
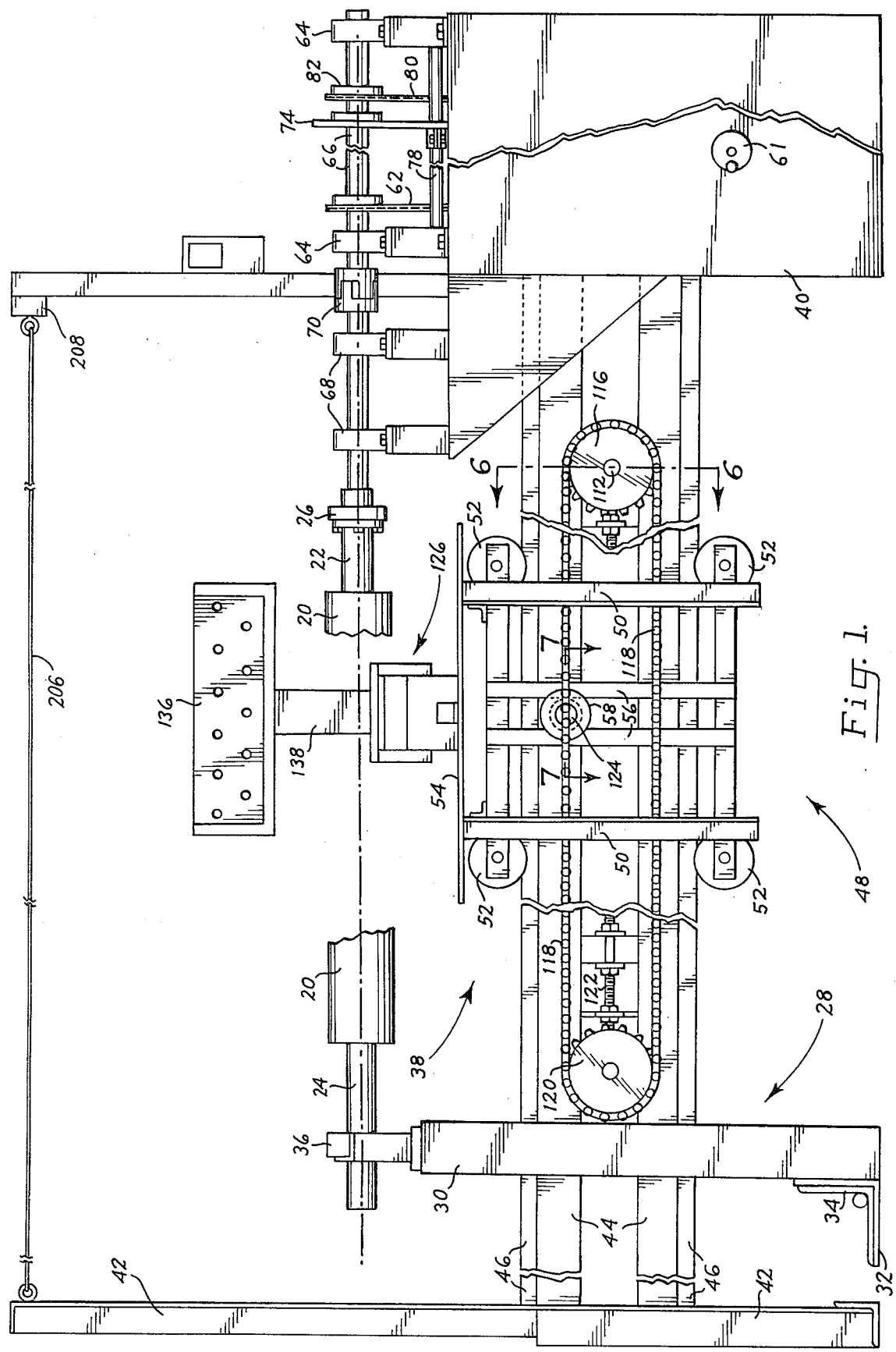
FIG. 1 is a foreshortened view in side elevation of the hereindescribed winding apparatus for the manufacture of filament wound reinforced resinous products.

In the form of the invention illustrated in FIGS. 1 and 2, the mandrel comprises a pipe-forming cylinder 20 which may be as much as 30 or 40 feet in length and several feet in diameter. The cylinder is fabricated from polished steel and preferably has a very slight taper to facilitate removal of the work piece at the conclusion of the winding operation.

At its ends the cylinder has axles 22, 24. Axle 22 is releasably coupled through coupling 26 to the mandrel drive. Axle 24 is supported on a standard indicated generally at 28.

This member of the assembly comprises a vertical frame 30 connected at its bottom end to a foot plate 32 by means of hinges 34.

At its upper end standard 28 mounts a cradle or yoke 36 which gravitationally supports axle 24 of the mandrel. In its illustrated form, FIG. 10, the cradle consists of a pair of maple or other wooden timbers arranged in a V which receives the mandrel axle. This simple construction makes it possible to mount and demount the mandrel easily and quickly. Since the mandrel revolves slowly, the assembly is essentially self-lubricating and wears very little. Also, the cradle may be placed out of the way during mandrel changing by lifting up on the mandrel, and pivoting standard 30 downwardly about hinges 34.

The Carriage

The construction of the carriage assembly which cooperates with the mandrel in winding resin impregnated filaments about the mandrel is illustrated particularly in FIGS. 1, 2, 6 and 7.

The carriage is mounted on a track indicated generally at 38. The track is positioned parallel to the mandrel a spaced distance therefrom. It is supported on one end by a frame 40 and at the other end by standard 42.

The track is constructed, FIG. 6, from upper and lower angle irons 44 each of which mounts a track-forming angle iron 46.

The carriage which tracks on angle irons 46 is indicated generally at 48 and is illustrated particularly in FIGS. 1 and 7. It comprises a carriage frame 50 having rotatably mounted wheels 52 which track on tracks 46, top and bottom. The frame supports a platform or table 54.

A pair of spaced, vertical bars 56, FIG. 7, provide guides in which works a slide 58, used to connect the carriage to a reciprocating drive.

The Mandrel and Carriage Drive

Figure 4:
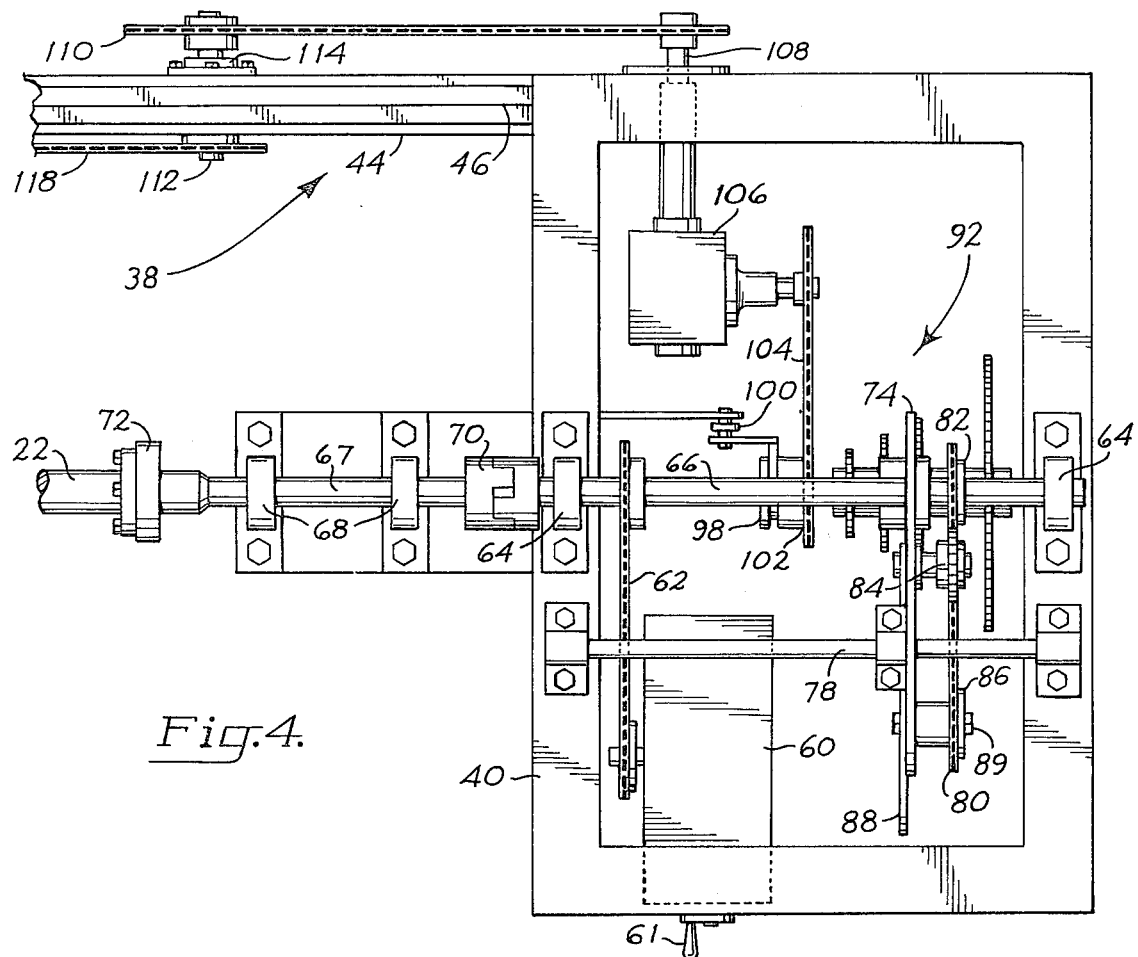
FIG. 4 is a fragmentary plan view of the apparatus, further illustrating the mandrel and carriage drive.
Figure 3:
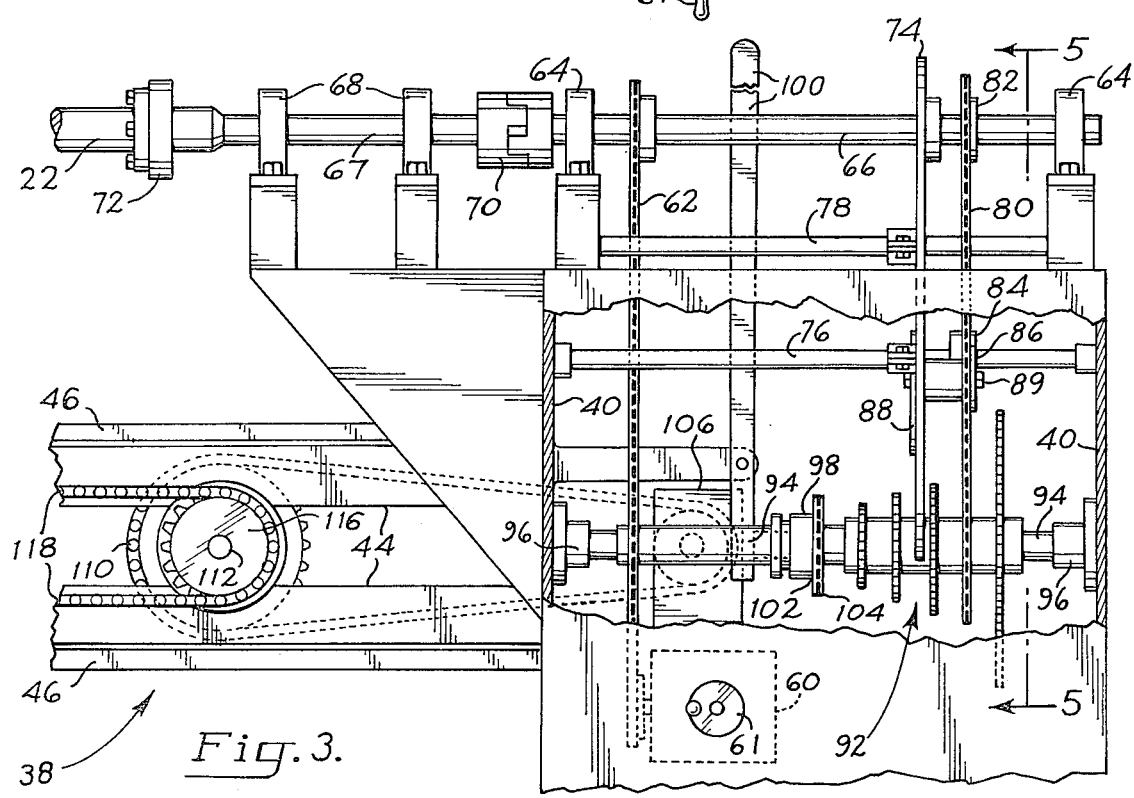
FIG. 3 is a fragmentary elevation partly in section of the apparatus, illustrating the mandrel and carriage drive.

The drive for the mandrel and carriage is illustrated in FIGS. 3, 4 and 5.

A variable speed motor 60 with control 61 drives through chain and sprocket assembly 62 a drive shaft 66. The latter is aligned with mandrel 20 and is journaled in bearings 64 which are bolted to the upper surface of frame 40. A direct drive is provided to the mandrel through connecting shaft 67. This shaft is journaled in bearings 68 and is coupled at one of its ends to drive shaft 66 by means of a flexible coupling 70 which facilitates removal and changing of the mandrel. At its other end connecting shaft 67 is coupled to axle 22 of the mandrel by means of coupling 72.

The carriage 48 is driven through a shiftable chain and cluster sprocket assembly.

A vertical shift plate 74 is slidably mounted on drive shaft 66, as well as on support shafts 76, 78. A power takeoff chain 80 meshes with a drive sprocket 82, FIG. 5, a first idler sprocket 84 rotatably mounted on shift plate 74, and a second idler sprocket 86 rotatably mounted on a chain-tightening lever arm 88 through an arcuate slot 90 in plate 74.

Power take-off chain 80 further engages a selected one of the component sprockets of sprocket cluster 92.

Sprocket cluster 92 is keyed to a shaft 94 rotatably mounted in end bearings 96. A clutch 98 operated by lever 100 is included in the assembly to permit disengaging the carriage drive at will.

A drive sprocket 102 also is keyed to shaft 94. It drives a chain 104 which in turn drives a right angle gear box 106. The power take-off shaft 108 of the latter drives a chain and sprocket assembly 110 which in turn drives the carriage in reciprocating motion. This is accomplished by the linkage illustrated particularly in FIGS. 1 and 6.

Chain and sprocket 110 drive a shaft 112 rotatably mounted in bearings 114 bolted to track members 46. Shaft 112 mounts a sprocket 116 which drives an endless chain 118. This chain is further supported by idler sprocket 120 with associated chain take-up 122.

Two of the links of chain 118 are pinned to slide 58 in the manner illustrated in FIG. 7, a spacer 124 being interposed between the chain and the slide.

Thus motor 60 drives endless chain 118 through shiftable cluster sprocket assembly 92 and thereby imparts reciprocating motion to carriage 48. The travel speed of the carriage is determined by the motor speed and also by which of the component sprockets of cluster sprocket 92 is engaged by chain 80. Shifting from one to the other of the sprockets is accomplished, FIG. 5, by releasing lever 88, relaxing chain 80, removing the chain from the sprocket of the sprocket cluster with which it is engaged, shifting plate 74 and hence chain 80 with associated sprockets until it is aligned with the selected alternate one of the sprockets of the cluster sprocket, engaging the chain with the latter sprocket, and then tightening up on lever 88 and cinching down on a retaining nut 89, provided for that purpose.

The Resin Vat

Figure 9:
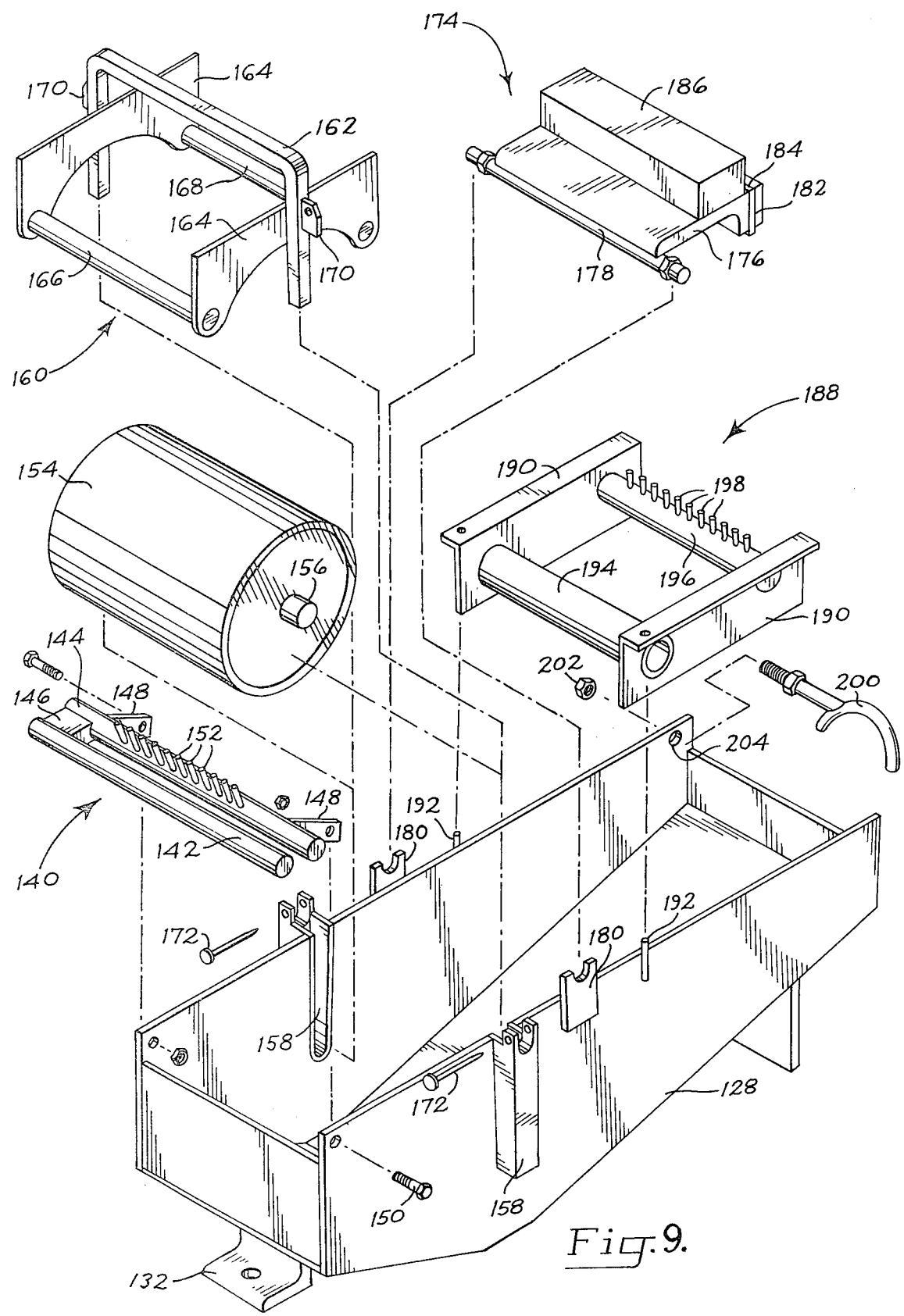
FIG. 9 is an exploded view of the vat illustrating in detail its component parts.

The resin vat assembly, indicated generally at 126, has for its function impregnating fiberglass or other filaments and guiding them on to the mandrel. Its construction is illustrated in FIGS. 2, 8 and 9.

Considering that it is used in making filament wound reinforced resinous products several feet in diameter and many feet long, the resin vat may be of relatively small proportions. It comprises an elongated container or vat 128 open at the top and having the contour illustrated in FIGS. 8 and 9. In a typical installation it may measure slightly over two feet in length, seven or eight inches in width, and eight or nine inches in height. Hence it is readily portable for installing, filling, emptying, cleaning and storing.

The resin vat is mounted on platform 54 of reciprocating carriage 48 in the manner illustrted in FIG. 2. It thus is situated between the filament source, usually a plurality of spools, not illustrated, but wound with filaments 130, and mandrel 20. It is demountably mounted on platform 54 by means of a foot 132 which receives a pin fixed to the platform, at one end, and a plate 134 at the other end of the vat. The vat is adapted to contain a quantity of liquid, settable resin such as catalyzed epoxy or polyester resin.

It serves the functions of guiding the filaments along the length of the vat in separated, parallel relation to each other, impregnating them with resin, squeegeeing off the excess resin, and, as they leave the vat, clustering them together preliminary to winding them on the mandrel. Since the resins employed are fast setting, the components of the vat assembly are so designed and installed that they may be removed quickly from the vat. This makes possible pouring out the resin and cleaning the vat when necessary to prevent the resin from solidifying in the vat.

Accordingly filaments 130, drawn from the spools on which they are stocked, pass first through a perforated plate 136 supported on an arm 138 attached to platform 54. The filaments then pass through an upstream guide assembly indicated generally at 140.

This assembly, FIGS. 8 and 9, is a bifurcated member comprising front and back spaced guide arms 142, 144 respectively, interconnected at one end only by block 146. This leaves one end of the guide assembly open for quick and easy removal of the filaments when necessary.

The upstream filament guide assembly is mounted by means of a pair of brackets 148 and bolts 150 which mount the guide assembly to the upstream end of the vat.

The upper surface of the back filament guide bar mounts a row of vertically-extending, spaced fingers 152 which separate the filaments from each other at the upstream end of the vat.

Immediately downstream from upstream filament guide assembly, 140 is resin applicator roll 154. This comprises a metal cylinder closed at its ends and equipped with axles 156. The roll is dimensioned for location in the lowermost or sump portion of the vat.

Rotatable mounting means are provided for rotatably mounting the roll in such a manner that it may be easily removed from the vat.

To this end there are provided on each side of the vat a pair of vertical channels 158 having rounded bottoms. The channels are open at the top and are dimensioned to receive axles 156 with the axles in bearing engagement with the rounded bottoms of the channels.

Roll 154 thus is seated gravitationally in channels 158. However, since in normal construction the roll is hollow, it tends to float in the viscous resinous liquid with which the vat is filled. Accordingly, there is provided a combination filament guide and roll holddown member, termed herein a "holddown guide assembly". It is indicated generally at 160 and is positioned above the roll for holding the filaments in frictional engagement with the upper surface thereof and also to maintain the roll in a submerged condition.

As shown in detail in FIG. 9, the holddown guide assembly is mounted on a bar 162 which is in the shape of an inverted U and which serves the ancillary purpose of a handle for the assembly by which it can be transported from one place to another.

A pair of side plates 164 are mounted at right angles to the bar in substantially parallel relation to each other. The undersurfaces of the plates are cut away in an arcuate contour conforming to the arc of the roll periphery. They serve as the holddown members for the roll.

Plates 164 support a pair of transverse guide rods 166, 168. These are positioned downwardly so that, as is particularly apparent in FIG. 8, they serve as guides to hold down the filaments and press them against the upper surface of resin applicator roll 154. This serves two functions. First it impregnates the filaments with resin; second, it engages the roll frictionally so that it is driven by the movement of the filaments.

The filament holddown guide assembly is demountably mounted on the sides of the vat by means of a pair of laterally extending perforated ears 170. The perforations in the ears register with perforations through the upper margins of channels 158 so that the assembly may be releasably secured by means of pins 172 inserted through the perforations.

A squeegee assembly indicated generally at 174 serves the function of wiping off excess resin from the filaments.

As shown particularly in FIG. 9, the squeegee assembly comprises a downwardly angled plate 176 one end of which is welded to a pivot shaft 178. Th ends of the shaft seat in recesses in upwardly extending brackets 180 welded to the sides of vat 128.

The outer downwardly angled end of squeegee plate 176 mounts by means of bolts or other suitable attaching means a plate 182 which clamps a rubber squeegee 184 to the squeegee plate. A weight 186 is superimposed on the plate to increase the efficiency of the squeegee in wiping excess resin off the filaments.

Cooperating with the squeegee assembly is a combination squeegee bar rod and filament guide indicated generally at 188.

This member of the assembly is supported on a pair of angle iron side plates 190. The upper, outwardly-angled segment of each of these is perforated for seating on pins 192 welded to the sides of the vat, for detachably mounting the assembly on the vat.

Plates 190 support between them a transverse squeegee bed rod 194. This is positioned directly below squeegee 184 and provides a bed against which the latter works.

Also mounted between plates 190 is a second transverse rod 196. This mounts a plurality of vertically arranged, spaced pins 198. These correspond to pins 152 on filament guide 140 at the upstream end of the apparatus. The two sets of pins serve to keep the filaments separate and aligned with each other as they pass through the vat.

At the extreme downstream end of the vat is mounted a downwardly arcuate guide bar 200. This is mounted to one of the sides of the vat by means of a threaded end and cooperating nut 202 which secure the guide bar through an opening 204 provided for that purpose.

Downwardly arcuate guide bar 200 receives filaments from filament guide 188 and clusters them together for uniform application to the mandrel.

OPERATION

The operation of the presently described winding apparatus for the manufacture of filament wound reinforced resinous products is as follows:

Referring to FIGS. 1, 2 and 8, filaments 130 from stock spools of the same are threaded individually through the openings in perforated plate 136. They are then threaded beneath arm 142 of upstream filament guide 140 and between fingers 152 thereof. They then pass beneath guide bar 166 of combination filament guide and roll holddown assembly 160, over the top of roll 154 which they frictionally engage and cause to rotate, and beneath the companion arm 168 of the holddown assembly.

Next they pass between squeegee 184 and squeegee bed rod 194, and thence between guide fingers 198 of unit 188 which cooperates with fingers 152 of unit 140 in maintaining the filaments in straight, aligned relation. The filaments next pass beneath downwardly arcuate clustering guide 200 and thence to mandrel 20 to which they are attached.

Drive chain 80 is meshed with the selected one of the sprockets of cluster sprocket 92 in order to establish the desired winding pattern to be applied to the mandrel of selected size.

Motor 60 is started, direct driving the mandrel through chain 62, FIGS. 3 and 4. Clutch 98 is engaged, driving right angle gear box 106, chain and sprocket assembly 110, and accordingly endless chain 118. This reciprocates carriage 48 mounting vat 126, FIG. 1, at a rate determined by the motor speed and the gear ratio.

As the mandrel turns, it draws the filaments through the vat, impregnating them with resin and squeegeeing off the excess. The resin-impregnated filaments then are wound about the mandrel in the manner illustrated in FIG. 2 while the carriage, and hence the vat, reciprocates back and forth the length of the mandrel. Accordingly, the filaments are wound spirally about the mandrel back and forth in the selected pattern until the desired thickness has been built up.

Clutch 98 then is disengaged, stopping the carriage. The filaments are cut, and the trailing ends wound completely about the mandrel. The mandrel continues to turn until the resin has completely set, the setting action being promoted, if desired, by the application of overhead heat lamps, not illustrated.

The mandrel next is lifted out of cradle 36, uncoupled at 26, and the curled work piece removed end-wise. This sequence may be carried out rapidly and with but minimum help by a single operator.

In the event of an emergency, the unit can be shut down quickly by pulling a trip line 206 which runs the entire length of the apparatus. This opens an electric switch 208 which kills the drive motor so that the unit stops. If the quick-setting resin contained in vat 126 tends to set up and harden in the vat, the unit may be shut down instantly, all of the components of the vat assembly illustrated in FIG. 9 quickly removed and, together with vat 126, wiped or cleaned with solvent for the removal of resin before it becomes completely hard.

By the use of the apparatus of my invention a single operator in an eight hour day easily can fabricate eight 20 foot pipes having a diameter of 10 or 12 inches.

Having thus described my invention in preferred embodiments, I claim:

1. Winding apparatus for the manufacture of filament-wound, reinforced resinous products, comprising:
    (a) a mandrel,
    (b) mandrel mounting means rotatably mounting the mandrel,
    (c) a track positioned parallel to the mandrel, a spaced distance therefrom,
    (d) a reciprocating carriage on the track,
    (e) drive means for the mandrel and the carriage,
    (f) variable speed coupling means coupling the drive means to the mandrel for rotating the same at a selected rotational speed,
    (g) a vat supported on the carriage and adapted to contain a quantity of liquid settable resin,
    (h) mounted in the vat an upstream filament guide for guiding a plurality of filaments in separated parallel relation into the vat,
    (i) a resin applicator roll rotatably mounted in the vat downstream from the upstream filament guide with at least its lower portion submerged in the liquid resin,
    (j) a filament holddown guide assembly positioned above the roll for holding the filaments in frictional engagement with the upper surface of the roll, the filament holddown guide assembly comprising a pair of vertical guides mounted on opposite sides of the vat, a substantially U-shaped bracket dimensioned for reception in the guides, a pair of transverse plates fastened to the bracket and secured in parallel relation to the opposite sides of the bracket, and a pair of guide bars extending transversely across the vat and mounted between the plates, one on each end thereof,
    (k) a squeegee assembly positioned downstream from the applicator roll for wiping excess resin from the filaments,
    (l) a downstream filament guide for maintaining the filaments in separated parallel relation as they traverse the vat and
    (m) a terminal clustering guide for clustering the filaments as they leave the vat and are applied to the mandrel,
    (n) the clustered filaments being attached to the rotating mandrel and being pulled thereby through the vat.

2. The winding apparatus of claim 1 wherin the side plates are positioned inside the vat and provided with arcuate undersurfaces contoured for reception of the upper surface of the roll and thereby acting as guiding retainers for the same.

3. Winding apparatus for the manufacture of filament-wound, reinforced resinous products, comprising:
    (a) a mandrel,
    (b) mandrel mounting means rotatably mounting the mandrel,
    (c) a track positioned parallel to the mandrel, a spaced distance therefrom,
    (d) a reciprocating carriage on the track,
    (e) drive means for the mandrel and the carriage,
    (f) variable speed coupling means coupling the drive means to the mandrel for rotating the same at a selected rotational speed,
    (g) a vat supported on the carriage and adapted to contain a quantity of liquid settable resin,
    (h) mounted in the vat an upstream filament guide for guiding a plurality of filaments in separated parallel relation into the vat,
    (i) a resin applicator roll rotatably mounted in the vat and downstream from the upstream filament guide with at least its lower portion submerged in the liquid resin,
    (j) a filament holddown guide assembly positioned above the roll for holding the filaments in frictional engagement with the upper surface of the roll,
    (k) a squeegee assembly positioned downstream from the applicator roll for wiping excess resin from the filaments, the squeegee assembly comprising a shaft, pivotal mounting means for pivotally mounting the shaft across the vat, a weighted plate having one end secured to the bar, and a squeegee mounted on the other end of the plate and positioned for engagement with the filaments, (l) a downstream filament guide for maintaining the filaments in separated parallel relation as they traverse the vat and (m) a terminal clustering guide for clustering the filaments as they leave the vat and are applied to the mandrel, (n) the clustered filaments being attached to the rotating mandrel and being pulled thereby through the vat.

4. Winding apparatus for the manufacture of filament-wound reinforced resinous products, comprising:

(a) a mandrel, (b) mandrel mounting means rotatably mounting the mandrel, (c) a track positioned parallel to the mandrel, a spaced distance therefrom, (d) a reciprocating carriage on the track, (e) drive means for the mandrel and the carriage, (f) a vat supported on the carriage for reciprocation therewith and adapted to contain a quantity of liquid settable resin, (g) a resin applicator roll rotatably mounted in the vat, and (h) filament guide means on the vat for guiding filaments over the applicator roll and through the vat from whence they extend for attachment to the mandrel, the filament guide means including a filament hold-down guide assembly comprising a pair of vertical guides mounted on opposite sides of the vat, a substantially U-shaped bracket dimensioned for reception in the guides, a pair of transverse plates fastened to the bracket and secured in parallel relation to the opposite sides of the bracket, and a pair of guide bars extending transversely across the vat and mounted between the plates, one on each end thereof.

5. The winding apparatus of claim 4 wherein the side plates are positioned inside the vat and provided with arcuate under surfaces contoured for reception of the upper surface of the roll and thereby acting as guiding retainers for the same.

6. Winding apparatus for the manufacture of filament-wound reinforced resinous products, comprising:

(a) a mandrel, (b) mandrel mounting means rotatably mounting the mandrel, (c) a track positioned parallel to the mandrel, a spaced distance therefrom, (d) a reciprocating carriage on the track, (e) drive means for the mandrel and the carriage, (f) a vat supported on the carriage for reciprocation therewith and adapted to contain a quantity of liquid settable resin, (g) a resin applicator roll rotatably mounted in the vat, and (h) filament guide means on the vat for guiding filaments over the applicator roll and through the vat from whence they extend for attachment to the mandrel, the filament guide means including a squeegee assembly comprising a shaft, pivotal mounting means for pivotally mounting the shaft across the vat, a weighted plate having one end secured to the bar, and a squeegee mounted on the other end of th plate and positioned for engagement with the filaments.

* * * * *